United States Patent [19]

Kobayashi

[11] Patent Number: 4,779,114
[45] Date of Patent: Oct. 18, 1988

[54] SHUTTER DRIVING MECHANISM

[75] Inventor: Kiyotaka Kobayashi, Tokyo, Japan

[73] Assignee: Fuji Photo Film Co., Ltd., Kanagawa, Japan

[21] Appl. No.: 89,011

[22] Filed: Aug. 21, 1987

Related U.S. Application Data

[63] Continuation of Ser. No. 860,790, May 8, 1986, abandoned.

[30] Foreign Application Priority Data

May 8, 1985 [JP] Japan ............................... 60-96070

[51] Int. Cl.$^4$ ........................... G03B 3/00; G03B 9/22
[52] U.S. Cl. ................................. 354/400; 354/234.1
[58] Field of Search .............................. 354/400–408, 354/195.1, 234.1, 235.1

[56] References Cited

U.S. PATENT DOCUMENTS

| 3,274,914 | 9/1966 | Biedermann et al. | 354/404 |
| 3,683,777 | 8/1972 | Miyagawa | 354/404 |
| 4,634,254 | 1/1987 | Ogihara et al. | 354/403 |

*Primary Examiner*—W. B. Perkey
*Attorney, Agent, or Firm*—Young & Thompson

[57] ABSTRACT

A shutter driving mechanism used in a camera which has a focusing ring rotatable about the optical axis of an objective lens includes a motor driven shutter operating ring rotatable coaxially with the focusing ring. The shutter operating ring and the focusing ring are operationally interconnected with each other by a clutch mechanism which is adapted to disconnect the interconnected rings from each other in response to a focus signal produced by an automatic focus detecting device incorporated in the camera. The focusing ring is rotationally moved by the motor driven shutter operating ring to produce the axial movement of the objective lens in order to position the latter to a proper focus position. The clutch mechanism releases the interconnection between the rings in response to a focus signal produced by an automatic focus detecting device so as to leave the focusing ring at a position where the objective lens is positioned in order to properly focus an image of an object to be photographed on the image plane of the camera, while the shutter operating ring continues to move rotationally for performing the shutter operation.

5 Claims, 3 Drawing Sheets

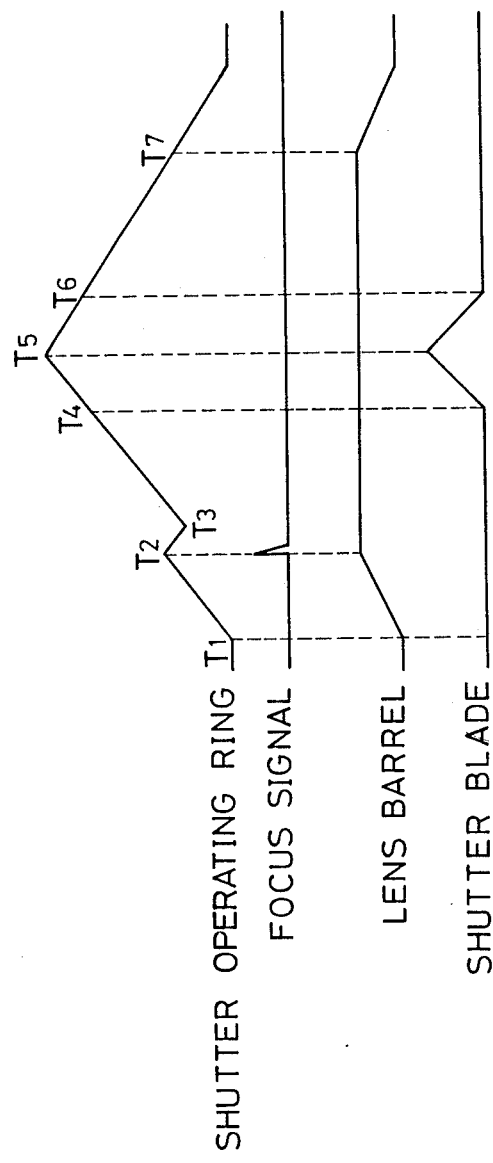

SHUTTER DRIVING MECHANISM

This application is a continuation of application Ser. No. 860,790, filed 5/8/86, abandoned.

BACKGROUND OF THE INVENTION

The present invention relates to a shutter driving mechanism for photographic cameras, and more particularly to a shutter driving mechanism having a shutter operating ring rotatable about the optical axis of an objective lens of the camera, whose rotational movement causes an axial movement of the objective lens in order to position the latter in a proper focus position.

Recent photographic compact cameras are usually equipped with automatic focusing devices. As is well known in the art, the automatic focusing device is a control system for automatically positioning the axially movable objective lens in a desired focus position in order to properly focus an image of a remote subject on the image plane of the camera in response to a signal representative of the distance to the remote subject. These automatic focusing devices comprise an optical focus detecting means and a lens positioning means which includes a member movable in response to the focus detecting operation. Therefore, such cameras include driving mechanisms for the movable member incorporated therein.

On the other hand, a recent tendency in compact cameras is to provide a shutter operating ring, which is rotated about the optical axis of an objective lens by means of a motor or electromagnetic coil to open and close shutter blades. In accordance with such a shutter driving device, a mechanism can be arranged around the objective lens and operationally linked with the shutter blade. This arrangement is beneficial to make cameras thin. Furthermore, since the opening and closing of the shutter blades are driven by an electromagnetic force, exposure controls can be advantageously performed with a high accuracy.

The above-described movable member is generally formed as a focusing ring which is mounted around the objective lens for rotatable movement. For this reason, if it is desired to arrange the shutter operating ring rotatable around the axis of the objective lens for opening and closing the shutter blades, driving mechanisms both of the focusing ring and of the shutter operating ring are concentrated around the objective lens, resulting not only in a complicated structure but also in a troublesome assembling operation.

Therefore, the present invention has as its object to provide a shutter driving mechanism which allows to arrange a shutter driving ring and a focusing ring around the objective lens.

It is another object of the present invention to provide a shutter driving mechanism in which a shutter operating ring can cause, as a result of its rotational movement, a focusing ring to rotate around the axis of the objective lens so as to produce axial movement of the objective lens.

It is still another object of the present invention to provide a shutter driving mechanism which makes it unnecessary to provide any driving mechanism separately for a focusing ring.

It is a further object of the present invention to provide a shutter driving mechanism which can avoid a complicated structure and troublesome assembly operations.

SUMMARY OF THE INVENTION

For accomplishing the above-described objects, the present invention comprises a motor-driven shutter operating ring rotatable about the axis of an objective lens for causing the opening and closing of a shutter, a focusing ring rotatable coaxially with the shutter operating ring for positioning an objective lens in a proper focus position, and means provided between the shutter operating and focusing rings, these means being adapted to operationally interconnect the rings with each other and to disconnect the once-interconnected rings in response to a focus signal provided by an automatic focus detecting device. After this disconnection, the shutter operating ring continues to rotate for performing the opening and closing of the shutter with leaving the focusing ring in the disconnected position.

In accordance with a preferred embodiment of the present invention, when a focus signal is provided by an automatic focus detecting device, while a clutch means is moved into a disconnecting position, a latching means is actuated to hold the focusing ring in the disconnected position for preventing reverse rotational movement of the focusing ring. After the disconnection, the shutter operating ring is continuously rotated to a predetermined angular position for performing the opening and closing of shutter. Then the shutter operating ring is reversed in rotation. During the reverse rotational movement of the shutter operating ring, this ring releases the latch means, allowing the focusing ring to return to its initial position. As the automatic focus detecting device, the present invention allows using either the active type or the passive type of automatic focus detecting devices.

According to a feature of this invention, as there is no need to provide a driving mechanism for the focusing ring in addition to that for the shutter operating ring, the structure around the objective lens is considerably simplified. And since the sequential operations of shutter actuation and focusing can be performed by a single reversible motor, no complicated electrical structure is required.

The invention and its objects and advantages will become more apparent in the detailed description of the preferred embodiment presented below.

BRIEF DESCRIPTION OF THE DRAWINGS

In the detailed description of a preferred embodiment of the present invention, reference is made to the accompanying drawings in which:

FIG. 4 is a time chart showing the operational timing.

DETAILED DESCRIPTION OF THE INVENTION

Because photographic cameras are well known, the present description will be directed in particular to elements forming part of, or cooperating more directly with, the present invention, camera elements not specifically shown or described herein being understood to be selectable from those known in the prior art.

Figure 1:
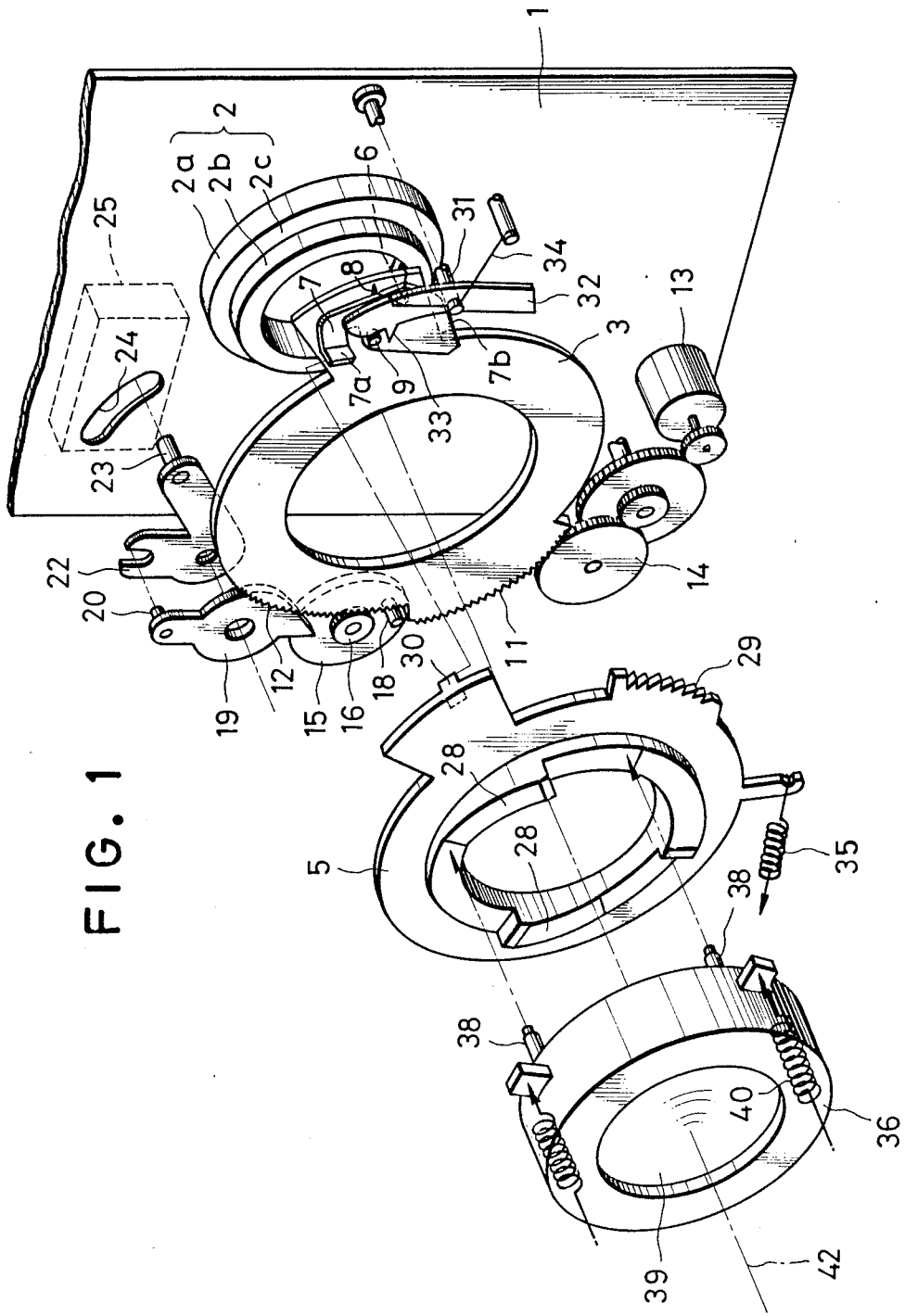
FIG. 1 is an exploded perspective view illustrating the shutter driving mechanism of an embodiment of the present invention.

Referring now to FIG. 1 illustrating the shutter driving mechanism of an embodiment in accordance with the present invention, a base plate 1 on which the shutter mechanism is arranged is provided with a mounting 2 which comprises an enlarged diameter portion 2a and a small diameter portion 2b. On the enlarged diameter portion 2a, a shutter operating ring 3 is mounted for rotational movement. On the other hand, on the small diameter portion 2b, a focusing ring 5 is mounted for rotatable movement. The focusing ring 5 is forced to be in contact with the flanged surface 2c so as to rotate in the same plane. Since the enlarged diameter portion 2 is thicker than the shutter operating ring 3, there is a certain space between the shutter operating and focusing rings 3, 5.

On the radially projecting portion of the shutter operating ring, a shaft 6 is mounted for rotational movement to support a clutch lever 7 provided with a pin 9. The clutch lever 7 is normally urged in the counterclockwise direction by a spring 8. As is seen in FIG. 1, the shutter operating ring 3 is partially provided with teeth on sections 11, 12 of the periphery thereof. Engaging with the toothed section 11 is a gear 14 which is driven by a stepping motor 13 mounted on the base plate 1. On the other hand, a gear 16 formed integrally with a disk 15 is engaged with the toothed section 12.

A pin 18 which is mounted on the disk 15 causes an interlocking lever 19 to swing in the counterclockwise direction upon clockwise rotation of the disk 15 along with the gear 16. As a result of the swinging of the interlocking lever 19, a crank lever 22 is caused to swing in the counterclockwise direction by a pin 20 on the interlocking lever 19. The crank lever 22 is provided with an actuating pin 23 which penetrates the base plate 1 passing through a circular arcuate slot 24 formed therein and actuates a shutter blade driving mechanism 25 attached to the back of the base plate 1.

The focusing ring 5, which rests on the front surface 2c of the enlarged diameter portion 2a so as to rotate in the same plane as previously described, is formed on its front surface with cams 28 each of which gradually increases in height in the direction of forward rotation of ring 5. The focusing ring 5 is partially provided on its periphery with ratchet teeth 29, into one of whose tooth gaps a tooth 33 of an engaging lever 32 rotatably mounted on a shaft 31 projecting from the base plate 1 engages, so as to prevent reverse rotational motion of the focusing ring. That is to say, the tooth 33 and the ratchet teeth 29 constitute a one-way clutch.

The focusing ring 5 is further formed with a radially projecting portion with a projection 30 protruding from the back thereof. The projection 30 is engaged and disengaged by a forwardly raised lip 7a on the clutch lever 7. Specifically, when the clutch lever 7 is so positioned as to restrict its counterclockwise rotational movement against the force of the spring 8 through the abutment of its lower edge 7b with sahft 31, the projection 30 is engaged by lip 7a the clutch lever 7; and, on the other hand, when the clutch lever 7 is rotatably moved in the counterclockwise direction under the influence of the force of spring 8, the projection 30 and the lip 7a are disengaged.

An objective lens barrel 36 bearing lenses 39 therein is forced by compression springs 40 axially rearwardly in order to press propping pins 38 extending rearwardly from the lens barrel 36 against the surface cams 28. As is well known in the photographic art, the lens barrel 36 is allowed to move along the optical axis 42 without any play, but is prevented from rotating around the optical axis 42. Such restricted motion of the lens barrel 36 can be accomplished by a conventional mechanism which is well known per se and is not shown in the figures.

The operation of the above-described shutter driving mechanism will be described in conjunction with FIGS. 1 through 4.

Figure 2:
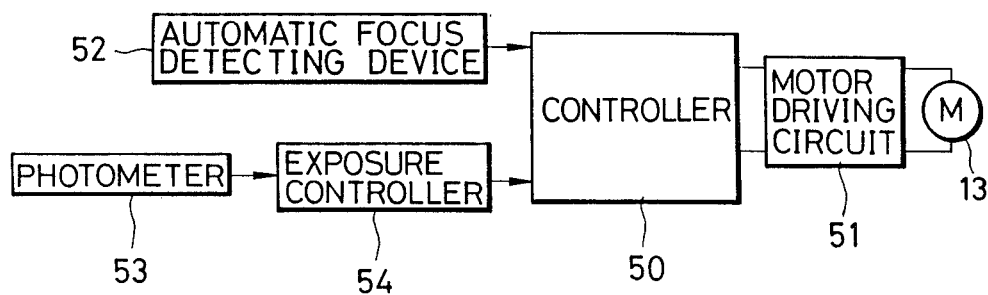
FIG. 2 is a block diagram showing a circuit for use in the shutter driving mechanism of FIG. 1.
Figure 3:
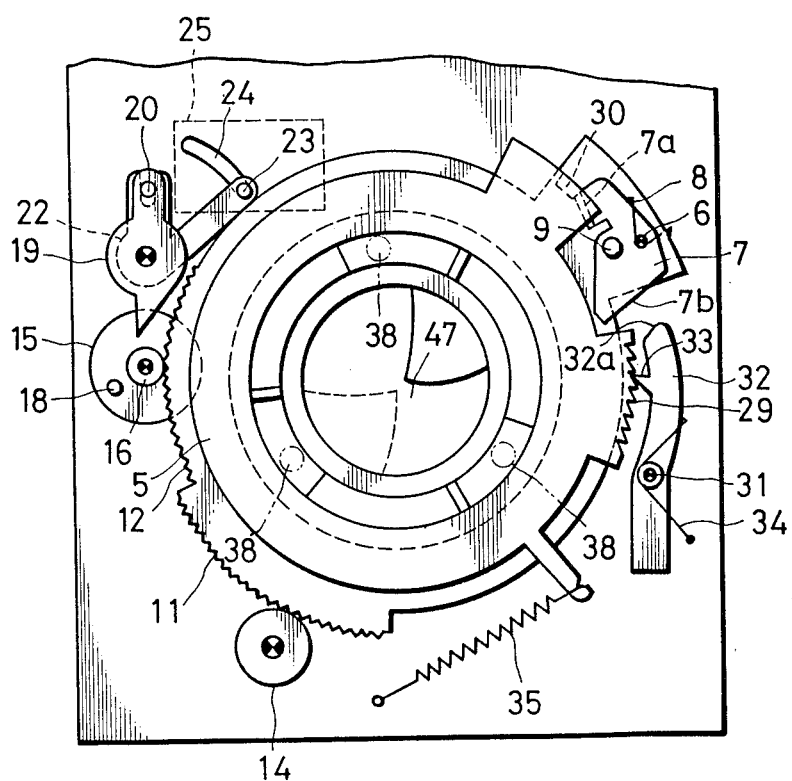
FIG. 3 is a front view of the shutter driving mechanism of FIG. 1, schematically showing the operation.

When a shutter release is effected, a controller 50 shown in FIG. 2 is caused to rotate a stepping motor 13 in its normal clockwise direction through a motor driving circuit 51, rotating the gear 14 in the clockwise direction so as to rotate the shutter operating ring 3 in the counterclockwise direction starting from the position shown in FIG. 1. At the same time, the clutch lever 7 itself moves together with and in the same direction as the shutter operating ring 3. Consequently, the lip 7a of the clutch lever 7 remains engaged with the projection 30 of the focusing ring 5 and thereby pushes the same in the counterclockwise direction as seen in FIG. 3. Although the clutch lever 7 is urged in the counterclockwise direction around shaft 6 by the spring 8, since the spring force is weaker than the frictional force between the projection 30 and the lip 7a during their engagement, the clutch lever 7 is never rotated in the counterclockwise direction around shaft 6 and therefore the lip 7a is not disengaged from the projection 30 until the shutter operating ring 3 is reversely rotated slightly, as will be described in detail later. Therefore, the focusing ring 5 is rotated in the counterclockwise direction against the force of spring 35 together with the shutter operating ring 3.

In the course of the rotational movement of the shutter operating ring 3, the pin 9 of the clutch lever 7 frees the engaging lever 32 to swing under the influence of the force of spring 34, so as that the tooth 33 snaps into one of tooth gaps of the ratchet teeth 29. As previously described, since the tooth 33 and the ratchet teeth 29 constitute a one-way clutch, the counterclockwise rotation of the focusing ring 5 is continuously allowed. It should be noted that, although the disk 15 is rotated by the shutter operating ring 3 through gear 16, the pin 18 is not brought into contact with the interlocking lever 19 all during the rotational movement of the focusing ring 5, so as not to actuate the shutter blade driving mechanism.

As a result of the rotational movement of the focusing ring 5 in the counterclockwise direction, the lens barrel 36 is gradually moved, by the movement of the surface cams 28, in the forward direction from its retracted position. Simultaneously, the automatic focus detecting unit 52 shown in FIG. 2 is actuated. At the moment when the lens barrel 36 is positioned to properly focus an image of a remote subject, the automatic focus detecting device 52 produces a focus signal which in turn is sent to a controller 50. As shown in FIG. 4 illustrating a time chart, when the shutter release operation is performed at the time $T_1$, the shutter operating ring 3 continuously rotates in its normal counterclockwise direction. At the time $T_2$ a focus signal is provided. The time $T_2$ when a focus signal is provided depends on the distance to a subject to be focused.

The controller 50, upon receipt of the focus signal, causes the stepping motor 13 to reverse for a predetermined short time, namely from the time $T_2$ to the time $T_3$. Consequently, since the shutter operating ring 3 now rotates in the clockwise direction, the clutch lever 7 is rotated in the counterclockwise direction around shaft 6 under the force of the spring 8 to disengage instantly the lip 7a of the clutch lever 7 from the projection 30 of the focusing ring 5. Meanwhile, the focusing ring 5 is prevented from reversing or rotating in the clockwise direction by the tooth 33 snapping into one of the tooth gaps, and thereby is kept stationary.

Upon the disengagement of the lip 7a from the projection 30, the clutch lever 7 is further rotated in the counterclockwise direction. After the passage of a prdetermined time, the controller 50, at the time $T_3$, causes the motor driving circuit 1 to rotate the stepping motor 13 again in its normal clockwise direction. As is apparent from the above, the focusing ring 5 is kept stationary in a position where the objective lens 39 is positioned to properly focus an image of a subject on the image plane of the camera, while the shutter operating ring 3 starts again at the time $T_3$ and continues to rotate in the counterclockwise direction after the passage of that predetermined time.

During the continuous movement of the shutter operating ring 3, the disk 15 is also rotated through the gear 16. At the time $T_4$, the pin 18 of the disk 15 strikes the interlocking lever 19 and rotates it in the counterclockwise direction. As a result of this rotational movement, the crank lever 22 is rotated so as to move the actuating pin 23 in the circular arcuate slot 24 from right to left in FIG. 3, actuating the shutter blade driving mechanism 25 to open the shutter blades 47 for starting exposure. An exposure controlled 54 can determine the exposure based on information as to the brightness of the subject from a photometer 53 which is well known per se in the photoraphic art and as to the film speed, and produces an exposure signal representing the determined exposure. Responsive to the exposure signal, the controller 50 sets the time $T_5$ at which the shutter blades start to close.

At the time $T_5$, the stepping motor 13 is instantly reversed to rotatably move the shutter operating ring 3 in the clockwise direction, and thereby moves the actuating pin 23 to right in FIG. 3. Consequently, the shutter blade driving mechanism 25 causes the shutter blades 47 to close for completing an exposure. As shown in FIG. 4, one exposure cycle is the period between the times $T_4$ and $T_5$. The time $T_5$ at which the stepping motor 13 is reversed to close the shutter blades 47 is automatically established by the controller 50 in accordance with an exposure signal from the exposure controller 54. As is well known in the art, the time $T_5$ is advanced if subjects to be photographed are brighter.

At a time $T_6$, the shutter operating ring 3 closes the shutter blades 47 completely. At a time $T_7$ in the continued rotational movement of the shutter operating ring 3, the clutch lever 7 at its lower edge 7b is brought into abutment with the shaft 31 and is forced to swing against the influence of spring 8 in the clockwise direction, so that the pin 9 of the clutch lever 7 presses against the engaging lever 32 at its upper edge 32a. As a result, the engaging lever 32 is swung against the force of spring 34 in the clockwise direction, disengaging the booth 33 from the tooth gaps of the toothed section 29. Upon this disengagement, the focusing ring 5 returns quickly clockwise under the force of the spring 35. At this time, since the clutch lever 7 has returned to its initial position through the abutment with the shaft 31, the focusing ring 5 stops in its initial position in which the projection 30 is engaged by the lip 7a of the clutch lever 7. In cooperation with the movement of the focusing ring 5, the lens barrel 36 is retracted to its initial position.

For the rotation of the shutter operating ring 3, the provision of the stepping motor 13, as in the above-described embodiment, is advantageous to control the operational timing of the components relative to each other, because the control can be performed on the basis of the numbers of pulses supplied to the motor driving circuit 51. However, it is permissible to incorporate usual DC motors together with potentiometers.

It is also permissible to use solenoids which operate in response to a focus signal from the automatic focus detecting device 52 to disconnect the operational linkage between the shutter operating ring 3 and the focusing ring 5 for the reversal of the shutter operating ring 3. The lens barrel 36 may be moved from its forward end position to its retracted end position by the rotational movement of the focusing ring 5 cooperatively caused by the rotational movement of the shutter operating ring 3. It is further permissible to move the focusing ring 3 and the lens barrel 36 separately. In this case, after the positioning of the focusing ring 5, the lens barrel 36 is moved to its proper position before the shutter blades are opened.

The invention has been described with particular reference to a preferred illustrative embodiment thereof, but it will be understood that variations and modifications can be effected within the spirit and scope of the invention.

What is claimed is:

1. A shutter driving mechanism used in cameras which have a focusing ring rotatable about an optical axis of an objective lens, said focusing ring being positioned at a desired focus position in response to a focus signal produced by an automatic focus detecting means, said shutter driving mechanism comprising:
    a shutter operating ring for opening and closing a shutter of said camera, said shutter operating ring being mounted on said camera to be rotatable coaxially with said focusing ring;
    a single battery-operated electric motor that rotates in one direction to rotate said shutter operating ring; and
    means provided between said focusing and shutter operating rings for releasably interconnecting said rings in order to rotate said focusing ring together with said shutter operating ring upon rotation of said electric motor, and to release the interconnection between said rings in response to said focus signal, thereby allowing further rotation of said shutter operating ring by said electric motor for performing said opening and closing of said shutter, while leaving said focusing ring in its released position.

2. A shutter driving mechanism as defined in claim 1, wherein said means is a clutch mechanism comprising an engaging portion of said focusing ring and a lever which is so mounted on said shutter operating ring as to swing in order to releasably engage with said engaging portion.

3. A shutter driving mechanism as defined in claim 1, comprising means for restraining the rotation of said focusing ring when said interconnection between said rings is released.

4. A shutter driving mechanism as defined in claim 2, comprising means to reverse the rotation of said shutter operating ring at the moment when said focus signal is produced to disengage said lever from said engaging portion, and then to permit rotation of said shutter operating ring again in a normal direction so as to perform said opening and closing of said shutter.

5. A shutter driving mechanism as defined in claim 2, comprising means to move said objective lens axially back and forth in cooperation with the rotation of said focusing ring.

* * * * *